April 8, 1930. G. F. BLUME 1,754,077
ROLLER BEARING
Filed Jan. 7, 1929 2 Sheets-Sheet 1

George F. Blume
Inventor
By C.A.Snow&Co.
Attorneys.

April 8, 1930.  G. F. BLUME  1,754,077
ROLLER BEARING
Filed Jan. 7, 1929   2 Sheets-Sheet 2
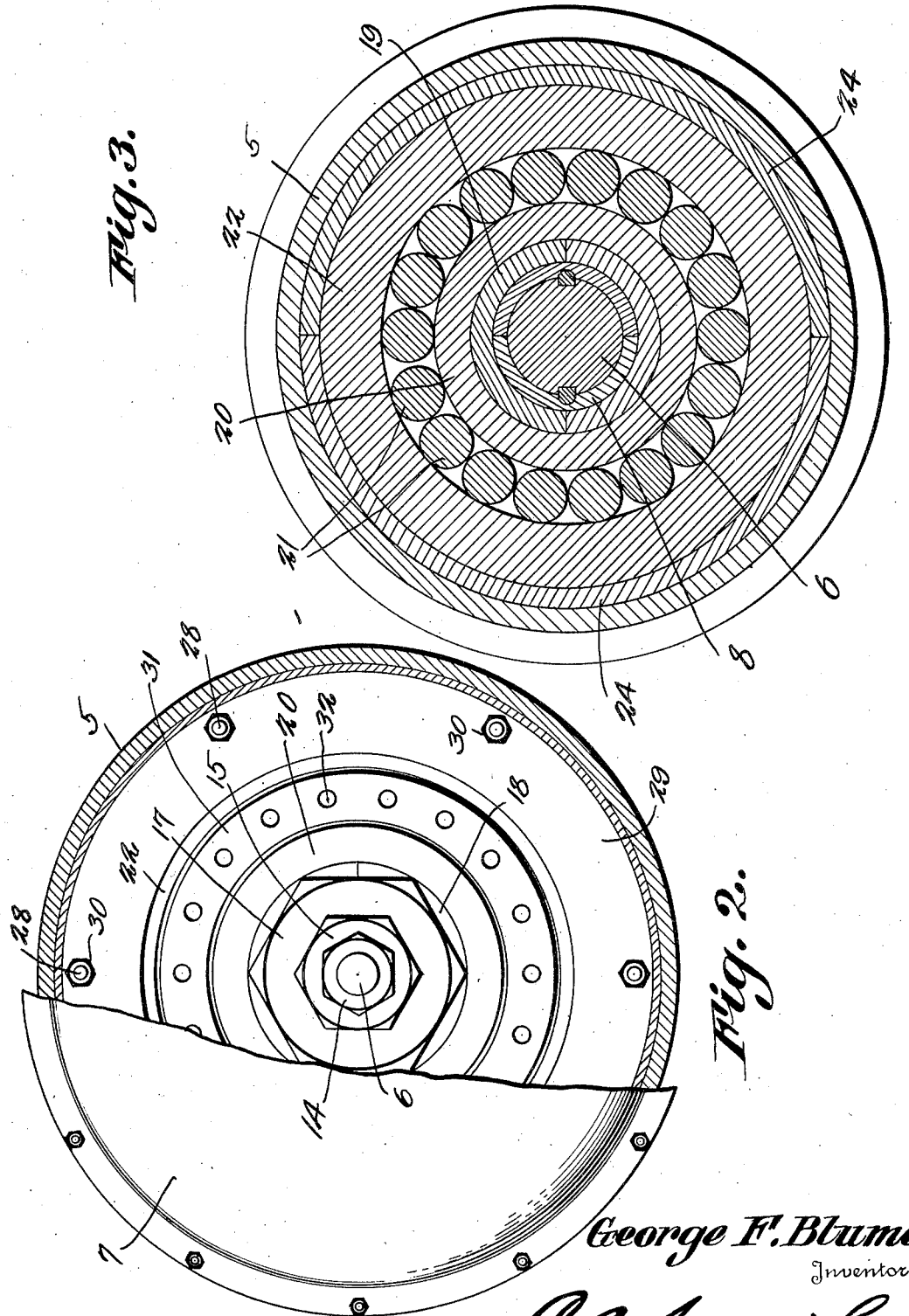
George F. Blume
Inventor
By C.A. Snow & Co.
Attorneys.

Patented Apr. 8, 1930

1,754,077

UNITED STATES PATENT OFFICE

GEORGE FRED BLUME, OF PHILADELPHIA, PENNSYLVANIA

ROLLER BEARING

Application filed January 7, 1929. Serial No. 330,918.

The present invention has reference to roller bearing construction, and aims to provide a roller bearing wherein the rollers and roller races taper, combining the features of a roller bearing and thrust bearing.

An important object of the invention is to provide a bearing of this type which may be readily and easily adjusted, and one which may be readily used in place of the roller bearing now in common use, eliminating the necessity of making alterations in the bearing housing construction, to install the bearing.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a sectional view taken approximately on the line 2—2 of Figure 1.

Figure 3 is a sectional view taken on line 3—3 of Figure 1.

Figure 1:
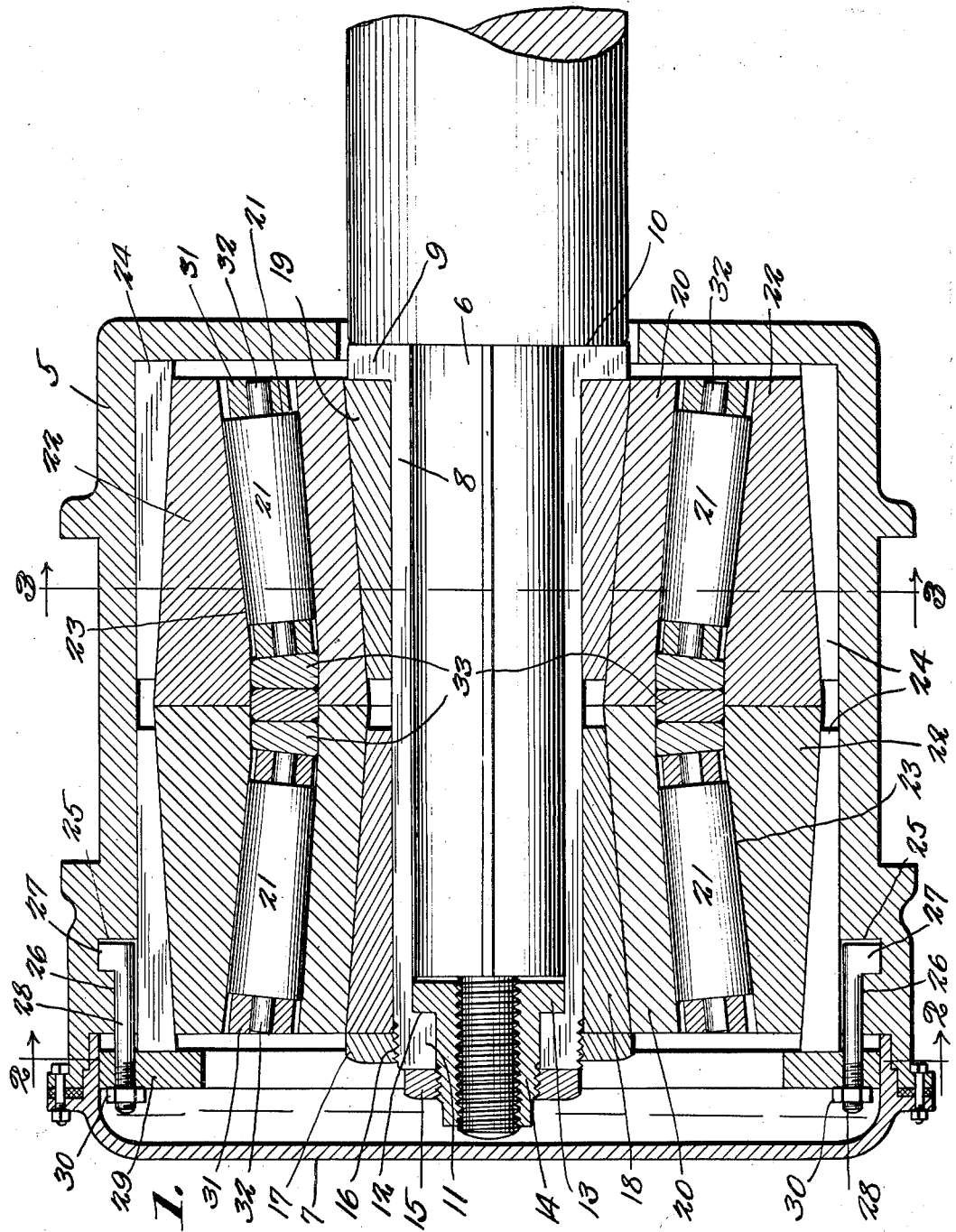
Figure 1 is a longitudinal sectional view through a bearing constructed in accordance with the invention.

Referring to the drawings in detail, the reference character 5 designates the bearing housing, which is of the usual and well known construction, the same being provided with an opening into which the axle 6 extends, there being provided a cover 7 for closing the outer end of the housing.

The reference character 8 designates a sleeve that is fitted over the axle 6, the sleeve being split longitudinally so that it may be moved into close engagement with the axle 6. At the inner end of the sleeve 8 is a flange 9 that abuts the shoulder 10 of the axle, the opposite end of the sleeve being provided with an enlargement 11 presenting a shoulder 12 to be engaged by the flange 13 of the nut 14. This nut 14 is formed with a threaded portion to receive the nut 15 that engages the outer end of the sleeve 8 to hold the sleeve against movement longitudinally of the shaft 6, and at the same time affords means whereby the inner bearings and races may be adjusted longitudinally of the shaft.

Threads 16 are formed on the sleeve 8 and accommodate the nut 17 that in turn bears against the tapered sleeve 18, which sleeve is also split to permit of contraction and expansion thereof. The flange 9 bears against the inner end of the inner tapered bearing sleeve 19 which is also split, the sleeves 18 and 19 being moved towards each other when the nut 17 is operated in a clockwise direction.

Inner roller races 20 are mounted on the sleeves 18 and 19, against which roller races the roller bearings 21 rest, there being provided outer roller races 22 formed with tapered inner surfaces 23 that engage the roller bearings 21.

Split sleeves 24 contact with the roller races 22 and secure the roller races 22 in position. Formed in the inner surface of the housing 5, are openings 25 that communicate with openings 26 formed in the housing 5 and extend to the outer end of the housing 5, the openings 25 being designed to receive the heads 27 of the bolts 28 that also extend through the ring 29 which in turn engages the outer end of the split sleeve 24 that is disposed adjacent to the outer end of the housing, with the result that when the nuts 30, which are disposed on the bolts 28, are operated, the sleeves 24 will be wedged into close engagement with the outer roller races 22, to hold them in position.

Outer and inner retainer rings 31 rest in the space between the outer roller races 22 and inner roller races 20, which retainer rings have openings to receive the shafts 32 of the tapered roller bearings 21. Spacer rings 33 are arranged between the outer ends of the inner shafts of the tapered rollers 21, to hold the roller bearings in proper spaced relation with respect to each other.

I claim:

1. In a device of the character described, a housing, an axle extending into the housing, a sleeve supported on the axle, tapered bearing sleeves mounted on the first mentioned sleeve, inner roller races on the tapered bearing sleeves, outer roller races having tapered inner surfaces, roller bearings mounted between the roller races, means for securing the outer roller races in position, and spacing rings arranged between the adjacent ends of the roller bearings.

2. In a device of the class described, a housing, an axle extending into the housing, tapered bearing sleeves within the housing, roller races supported on the bearing sleeves, outer roller races cooperating with the first mentioned roller races, to provide bearings, tapered roller bearings disposed between the roller races, and means for securing the roller races within the housing.

3. In a device of the class described, a housing, an axle extending into the housing, a sleeve mounted on the axle, a sleeve having an inclined outer surface mounted at the inner end of the first mentioned sleeve, a sleeve having an inclined outer surface mounted on the outer end of the first mentioned sleeve, roller races mounted on the last mentioned sleeves, tapered roller bearings positioned on the roller races, outer roller races on the bearings, and means for holding the bearings in spaced relation with each other.

4. In a device of the character described, a housing, an axle extending into the housing, sleeves having inclined outer surfaces, means for holding the sleeves in position on the axle, roller races mounted on the inclined outer surfaces of the sleeves, tapered roller bearings mounted on the bearing races, outer roller races having inclined inner surfaces positioned over the roller bearings, the outer roller races having inclined outer surfaces, sleeves having tapered inner surfaces engaging the outer surfaces of the last mentioned roller races to hold the last mentioned roller races in position, an adjusting ring engaging one of the last mentioned sleeves to hold the sleeves and roller races against movement, and a cover for closing the housing.

5. In a device of the character described, a housing, roller races supported within the housing, means for securing the roller races within the housing, retainer rings between the roller races, roller bearings having shafts extending into the retainer rings, spacer rings arranged at the inner ends of the roller bearings for holding the roller bearings in spaced relation with each other, and a cover for closing the housing.

6. In a device of the class described, a housing, an axle extending into the housing, tapered sleeves on the axle, roller races on the sleeves, roller bearings mounted on the roller races, outer roller races, sleeves engaging the outer roller races, said housing having openings, bolts having heads extending into the openings, a ring contacting with the sleeves engaging the outer roller races, said bolts extending through the ring, nuts on the ends of the bolts and engaging the ring to move the ring against the last mentioned sleeves to secure the roller races and roller bearings in position.

In testimony that I claim the foregoing as my own, I have hereto affixed my signature.

GEORGE FRED BLUME.